US012196623B2

(12) United States Patent
Zinkevich et al.

(10) Patent No.: US 12,196,623 B2
(45) Date of Patent: Jan. 14, 2025

(54) HIGH-TEMPERATURE CHIP

(71) Applicant: Yageo Nexensos GmbH, Kleinostheim (DE)

(72) Inventors: Matsvei Zinkevich, Kleinostheim (DE); Tim Asmus, Kleinostheim (DE); Stefan Dietmann, Kleinostheim (DE)

(73) Assignee: Yageo Nexensos GmbH, Kleinostheim (DE)

( * ) Notice: Subject to any disclaimer, the term of this patent is extended or adjusted under 35 U.S.C. 154(b) by 485 days.

(21) Appl. No.: 17/611,995

(22) PCT Filed: May 14, 2020

(86) PCT No.: PCT/EP2020/063419
§ 371 (c)(1),
(2) Date: Nov. 17, 2021

(87) PCT Pub. No.: WO2020/234097
PCT Pub. Date: Nov. 26, 2020

(65) Prior Publication Data
US 2022/0196486 A1  Jun. 23, 2022

(30) Foreign Application Priority Data
May 17, 2019  (DE) ................... 20 2019 002 164.7

(51) Int. Cl.
*G01K 7/18* (2006.01)
*G01K 1/08* (2021.01)
*G01K 7/16* (2006.01)

(52) U.S. Cl.
CPC ................ *G01K 7/18* (2013.01); *G01K 1/08* (2013.01); *G01K 2007/163* (2013.01)

(58) Field of Classification Search
None
See application file for complete search history.

(56) References Cited

U.S. PATENT DOCUMENTS 6,653,926 B1  11/2003  Zitzmann
9,508,664 B1  11/2016  Lin et al.
(Continued)

FOREIGN PATENT DOCUMENTS

CN    101290255    10/2008
CN    106887422     6/2017
(Continued)

OTHER PUBLICATIONS

Written Opinion and International Search Report in PCT/EP2020/063419 dated Jul. 31, 2020.

*Primary Examiner* — Erica S Lin
(74) *Attorney, Agent, or Firm* — Dicke, Billig & Czaja, PLLC

(57) ABSTRACT

One aspect relates to a high-temperature sensor, having a coated substrate. The substrate contains a zirconium oxide or a zirconium oxide ceramic, at least one resistance structure and at least two connection contacts. The connection contacts electrically contact the resistance structure. The substrate is coated with an insulation layer. The insulation layer contains a metal oxide layer, the resistance structure and the free regions of the insulation layer, on which no resistance structure is arranged, are coated at least in regions with a ceramic intermediate layer, and a protective layer and/or a cover is arranged on the ceramic intermediate layer. At least one opening is formed in the insulation layer, which exposes at least sections of a surface of the substrate.

14 Claims, 3 Drawing Sheets

(56) References Cited

U.S. PATENT DOCUMENTS

Figure 1:
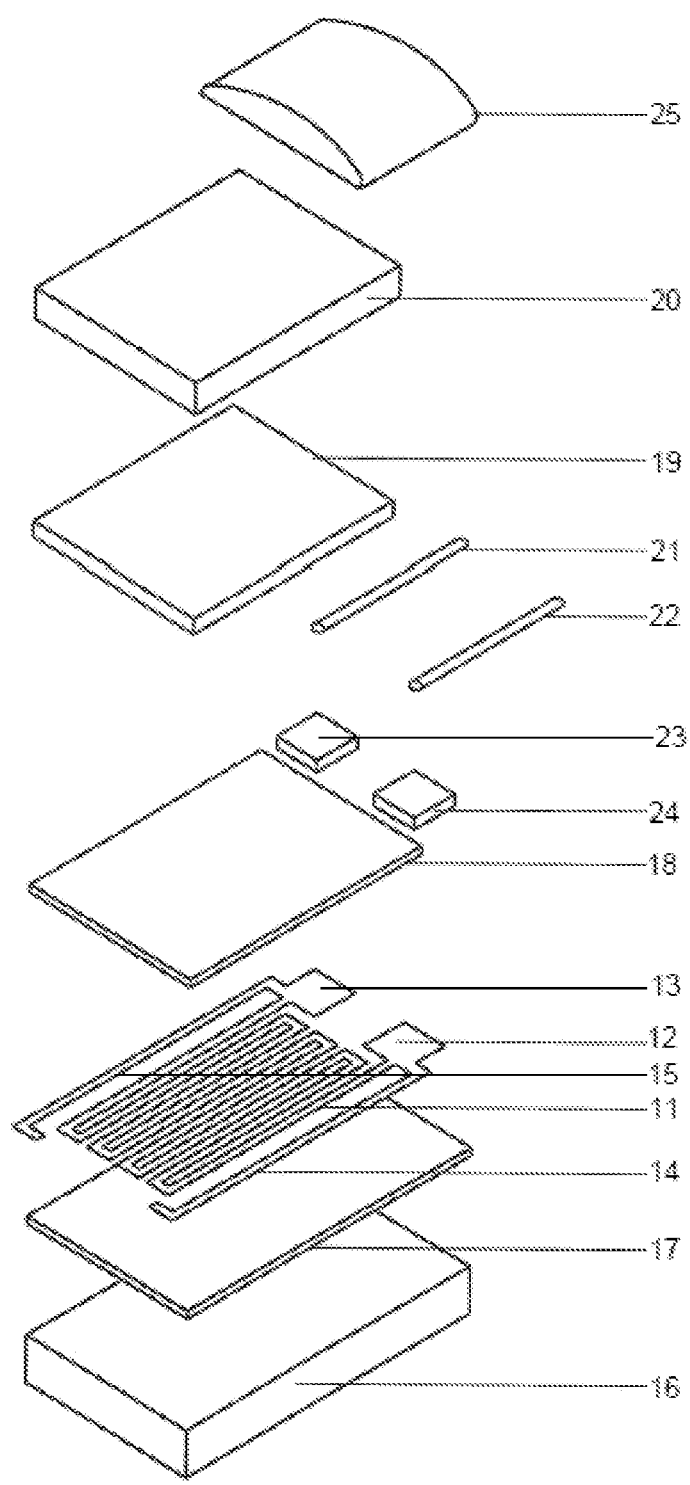

| | | | |
|---|---|---|---|
| 9,829,390 | B2 | 11/2017 | Wienand et al. |
| 2006/0081472 | A1 | 4/2006 | Wiedenmann et al. |
| 2009/0014435 | A1* | 1/2009 | Hayashida ........ H01L 21/67109 29/25.01 |
| 2010/0155951 | A1 | 6/2010 | Koike et al. |
| 2010/0289589 | A1* | 11/2010 | Ito ........................... H03L 1/022 331/70 |
| 2015/0292955 | A1* | 10/2015 | Wienand ................ G01K 13/02 374/185 |
| 2020/0271528 | A1 | 8/2020 | Wienand et al. |

FOREIGN PATENT DOCUMENTS

| | | |
|---|---|---|
| DE | 19901184 | 10/2000 |
| DE | 102012110210 | 4/2014 |
| KR | 10-1754508 | 7/2017 |
| TW | 201034153 | 9/2010 |
| WO | 0042402 | 7/2000 |
| WO | 2018/069415 | 4/2018 |

* cited by examiner

HIGH-TEMPERATURE CHIP

CROSS REFERENCE TO RELATED APPLICATION

This Utility Patent Application claims priority under 35 U.S.C. § 371 to International Application Serial No. PCT/EP2020/063419, filed May 14, 2020, which claims the benefit of German Patent Application No. 20 2019 002 164.7, filed May 17, 2019; which are both incorporated herein by reference.

The present invention relates to a temperature sensor, in particular a high-temperature sensor having a substrate, at least one resistance structure, and at least two terminal contacts, in which the terminal contacts make electrical contact with the resistance structure.

Such temperature sensors are used in the automotive industry to measure the exhaust gas temperature and/or combustion temperature of engine gases used. The measurement should take place frequently and as close as possible to the engine. Therefore, such sensors have to withstand the high temperatures of the combustion gases. Temperature sensors with a planar resistance structure are known, for example, from DE 197 42 696 A1.

Some proposals have been made in the prior art as to how such high-temperature-stable temperature sensors can be constructed. For example, DE 10 2007 046 900 B4 proposed a sensor with a self-supporting cover as protection for a platinum resistance structure. Another high-temperature sensor is known from DE 10 2009 007 940 B4, in which the substrate contains zirconium oxide. In order to prevent contamination with ions that are harmful to the platinum layer resistance structure, DE 10 2011 051 845 B4 proposes that galvanic electrodes be additionally applied to the substrate.

A temperature sensor that should also function with frequent temperature changes is known from DE 10 2012 110 210 B4. However, the temperature sensor described begins to drift at high temperatures after prolonged exposure to corrosive gases, in particular in the exhaust gas flow of an internal combustion engine. In the case of the temperature sensor described in DE 10 2012 110 210 B4, the observed deviation can be traced back to the diffusion of foreign atoms, such as chromium, nickel, iron, and silicon, from the exhaust gas flow into the resistance structure.

The object of the invention is therefore to overcome the disadvantages of the prior art. In particular, a temperature sensor is to be made available with a low sensor drift.

The object of the invention is achieved by means of a temperature sensor, in particular a high-temperature sensor, having a coated substrate, in which the substrate contains a zirconium oxide or a zirconium oxide ceramic, at least one resistance structure, and at least two terminal contacts, in which the terminal contacts make electrical contact with the resistance structure, in which the substrate is coated with an insulation layer, in which the insulation layer contains a metal oxide layer, the resistance structure and the exposed areas of the insulation layer, on which no resistance structure is arranged, are at least partially coated with a ceramic intermediate layer, and a protective layer and/or a cover is arranged on the ceramic intermediate layer, in which at least one opening is formed in the insulation layer, which opening exposes a surface of the substrate at least in sections.

According to the invention, the substrate includes a zirconium oxide or a zirconium oxide ceramic. In examples of the invention, the substrate may also consist or substantially consist of a zirconium oxide or a zirconium oxide ceramic.

In examples of the invention, the insulation layer can also consist or substantially consist of a metal oxide layer. In one example, the substrate consists of a zirconium oxide or a zirconium oxide ceramic and the insulation layer consists of a metal oxide layer.

The term "opening" can be understood to mean a material recess in the insulation layer or at the edge of the insulation layer. The material recess can be designed, for example, round, oval, rectangular, trench-shaped, or slot-shaped. The term "layer" can be understood to mean a flat layer or a substantially flat layer, in which several layers can be arranged on top of one another.

The stability of the high-temperature sensor is advantageously increased by forming at least one opening in the insulation layer, which exposes a surface of the substrate at least in sections. In examples of the invention, a plurality of openings are formed in the insulation layer.

In the temperature sensors known from the prior art, the insulation layer can form a channel for foreign atoms to penetrate. The porosity of the metal oxide in the insulation layer can be considered a reason for this. The porous structure promotes the diffusion of foreign atoms. When the foreign atoms reach the resistance structure, for example a platinum thin-film structure, they alloy with the platinum and change the electrical resistance of the platinum thin-film structure. This effect is minimized or eliminated by introducing at least one opening.

The opening or openings in the insulation layer, which expose a surface of the substrate at least in sections, form an area that does not have any metal oxide material and, depending on the design of the opening or openings, divide the insulation layer into separate segments. The openings can be designed in such a way that at least one central segment is created in the insulation layer, which segment is preferably arranged in the middle of the substrate. The openings are preferably contiguous and frame the central segment. The central segment can have edges, in which the edges of the central segment do not have a common termination with the edges of the substrate. The resistance structure and the ceramic intermediate layer applied to it for passivation can be located entirely on the central element. Both the central segment with the resistance structure and the ceramic intermediate layer and the framing opening can be covered with a protective layer made of, for example, a glass ceramic protective layer. In examples of the invention, the opening/openings are filled with the material of the protective layer. The opening filled with the material of the protective layer forms a diffusion barrier for foreign atoms from the edges of the insulation layer into the central segment.

In one example, the opening and/or openings are designed in the shape of slots, the slot width preferentially being between 5 µm and 1 mm, preferably between 10 µm and 300 µm, particularly preferably between 20 µm and 100 µm.

The longitudinal extension of the slot-shaped opening can be formed parallel and/or perpendicular to the longitudinal extension of the substrate, and/or the longitudinal extension of a plurality of slot-shaped openings can be formed parallel to one another.

In one example, the opening and/or openings expose at least one side surface of the substrate. In this context, the term "side surface" can be understood to mean an area on the side or on the edge of a flat surface of the substrate.

In one example, the opening and/or openings surround the resistance structure completely.

In another example, the opening and/or a further opening of the openings at least partially frames one of the two terminal contacts of the resistance structure.

In one example, the opening or openings are filled with a material of the protective layer.

In a further example, the zirconium oxide or the zirconium oxide in the zirconium oxide ceramic is stabilized with oxides of a trivalent and a pentavalent metal, and/or at least one electrode is arranged on at least one terminal contact next to the resistance structure on the insulation layer, in which the electrode or electrodes are formed as one piece with the resistance structure.

The stabilization of the zirconium oxide or the zirconium oxide in the zirconium oxide ceramic can be understood as a structural stabilization in which a certain crystal structure is stabilized. Yttrium oxide is particularly preferably used as the oxide of a trivalent metal. Tantalum oxide and/or niobium oxide is especially preferably used as oxides of a pentavalent metal. Suitable mixtures are known, for example, from EP 0 115 148 B1.

By stabilizing the crystal structure with trivalent and pentavalent metal oxides, the thermal expansion of the substrate can be adapted to the thermal expansion of the intermediate layer and the noble metals of the resistance structure. As a result, a thermally induced voltage can be avoided or reduced in the resistance structure.

In one example, the insulation layer is an aluminum oxide layer.

In a further example, the ceramic intermediate layer has a thickness between 1 μm and 50 μm, preferably a thickness between 4 μm and 10 μm.

These thicknesses are chosen so that a cover layer and possibly also a cover can be arranged on the intermediate layer without the intermediate layer, the cover layer, or the cover flaking off due to the differing thermal expansion.

In another example, the protective layer includes a glass or a glass ceramic and/or the cover is a ceramic plate.

In this case, the glass can, in particular, also be used to fasten the cover.

In one example, the resistance structure includes a platinum material or a platinum alloy, in particular a platinum-based alloy.

Platinum or platinum alloys are particularly well-suited for the production of high-temperature sensors.

The invention also proposes the use of a temperature sensor in an exhaust system for the control and/or regulation of an engine, in particular a motor vehicle engine.

The invention also proposes a method for producing a temperature sensor, in particular a high-temperature sensor, comprising: Providing and coating a substrate, in which the substrate contains a zirconium oxide or a zirconium oxide ceramic, with an insulation layer, and forming at least one opening in the insulation layer which exposes a surface of the substrate at least in sections, in which the insulation layer contains a metal oxide layer;

Arranging a resistance structure and at least two terminal contacts on the insulation layer, in which the terminal contacts make electrical contact with the resistance structure;

Coating the resistance structure and the exposed areas of the insulation layer, on which no resistance structure is arranged, with a ceramic intermediate layer at least in areas; and Arranging a protective layer and/or a cover on the ceramic intermediate layer.

In one example, forming the at least one opening in the insulation layer comprises the step:

Photolithographically forming the opening and/or forming the opening by laser ablation.

Providing the substrate may include providing a substrate made of zirconium oxide, stabilized with yttrium oxide and tantalum oxide. The substrate can have a thickness of 380 μm and a surface area of 50×50 mm$^2$. The insulation layer can be an aluminum oxide layer and be applied to the substrate using a physical vapor deposition (PVD) method. The layer can be porous and have a thickness of 2.4 μm.

In order to produce the resistance structure, a platinum thin film with a temperature coefficient of 3850 ppm/K can be first applied over the entire surface of the insulation layer by means of a PVD method. The resistance structure and the terminal contacts can then be produced by means of a photolithographic method.

Then, for example, the intermediate layer of aluminum oxide can be applied with a thickness of 8 μm by means of screen printing or by means of the aerosol deposition method (ADM), sputtering, or PVD. In this case, the intermediate layer can cover the platinum structure and the areas of the insulation layer adjoining the platinum structure. The contacts and the edge areas of the substrate can remain exposed and are not covered by the intermediate layer. The opening in the insulation layer can then be milled around the entire resistance structure and around the terminal contacts as a contiguous trench or slot in the insulation layer by means of a laser. For example, the width of the opening can be approximately 100 μm. With such a laser ablation of the insulation layer, the substrate can also be removed slightly on its surface in order to ensure complete removal of the insulation layer. Further openings can be made around the terminal contacts, for example.

After the opening or openings have been formed, a protective layer of a glass frit can be screen-printed over the entire surface and baked. The protective layer can cover the intermediate layer and the insulation layer and fill the opening or openings in the insulation layer. The terminal contacts can remain free of the material of the protective layer.

The cover, for example a hard cover made of zirconium oxide, which can be stabilized with yttrium oxide and tantalum oxide, can then be arranged with a thickness of 250 μm on the protective layer.

Finally, the resulting temperature sensors can be separated from the panel, and connecting wires can be connected to the terminal contacts.

Further features and advantages of the invention emerge from the following description, in which preferred embodiments of the invention are explained with reference to schematic drawings.

Figure 2A:
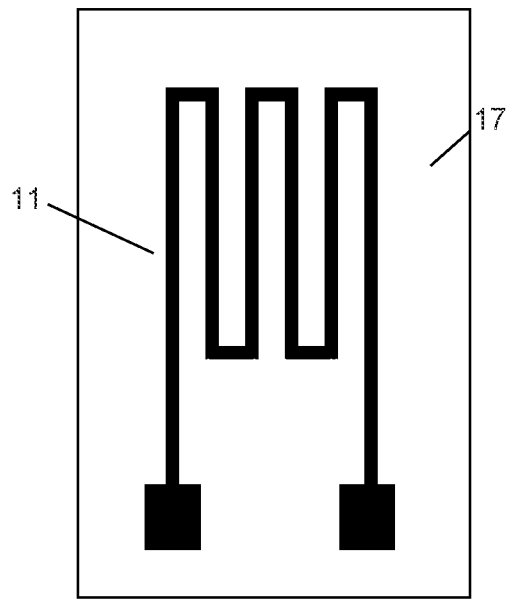
Figure 2B:
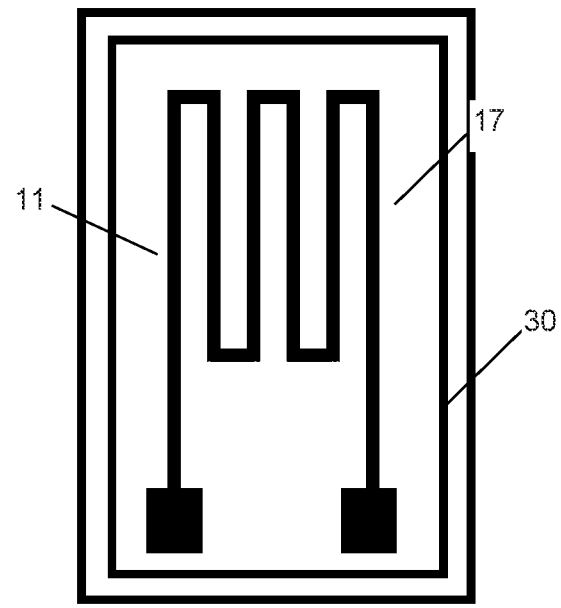
Figure 2C:
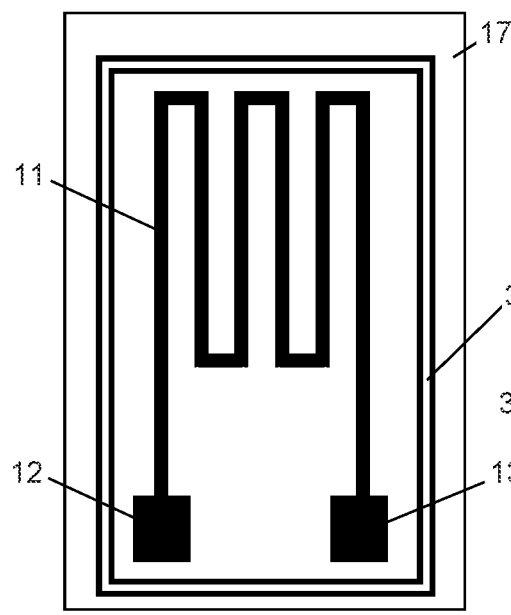
Figure 2D:
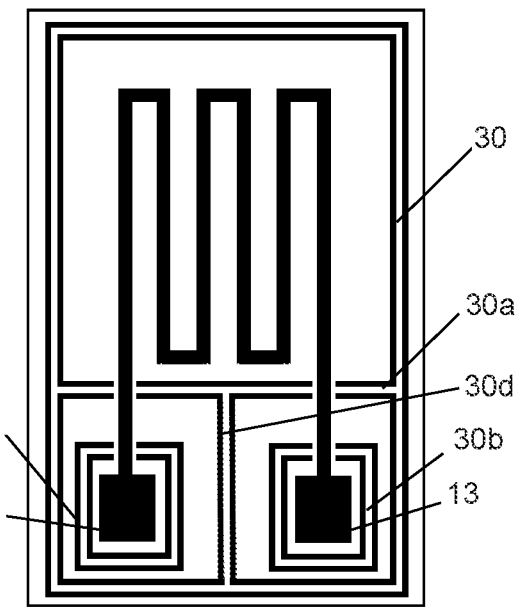
Figure 3A:
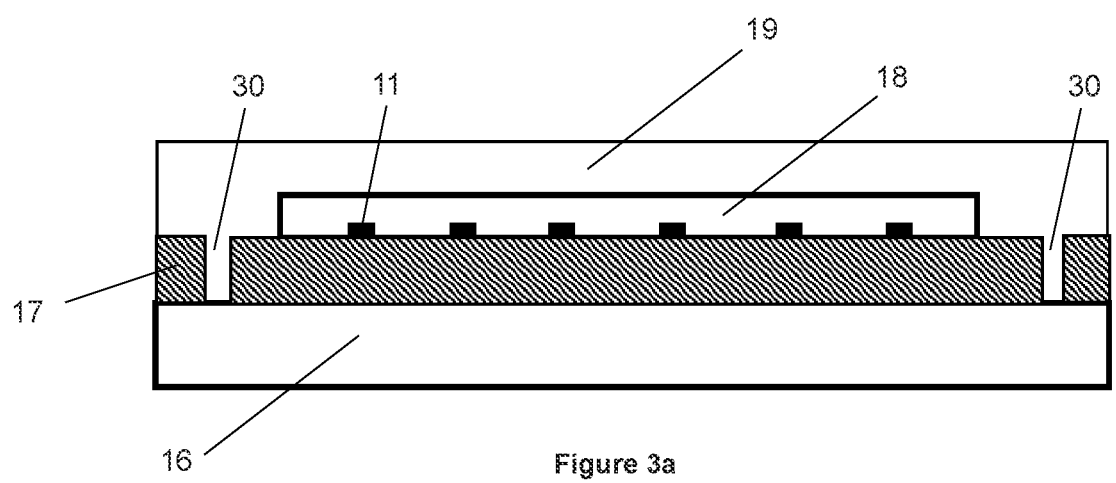
Figure 3B:
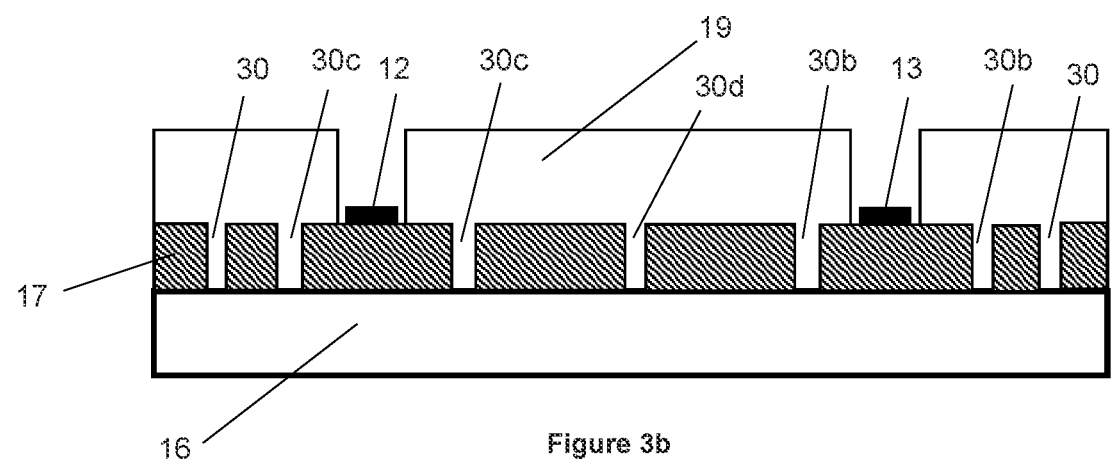

The drawings show the following:

FIG. 1 an exploded schematic view of a temperature sensor known from the prior art;

FIG. 2a a schematic top view of an insulation layer having a resistance structure of a temperature sensor known from the prior art disposed thereon;

FIGS. 2b-2d schematic top views of the insulation layers having openings and resistance structures disposed thereon according to embodiments of the invention; and FIGS. 3a and 3b schematic sectional views through a substrate having an insulation layer disposed thereon with openings, a resistance structure, an intermediate layer, and a protective layer according to an embodiment of the invention.

FIG. 1 shows an exploded schematic view of a temperature sensor known from the prior art. A meandering, layered resistance structure 11 is electrically connected to two terminal contacts 12, 13. The resistance structure 11 is framed on slightly more than two sides by two electrodes 14, 15.

A substrate 16 made of a stabilized zirconium oxide or a zirconium oxide ceramic is coated with an insulation layer 17 made of metal oxide, which ensures that the resistance structure 11 is not short-circuited by the zirconium oxide, which is conductive at high temperatures, and that any harmful interaction between the zirconium oxide and the resistance structure 11 is prevented.

On its side facing away from the substrate 16, the resistance structure 11 is provided with an intermediate layer 18 as a diffusion barrier, which in turn is provided with a protective layer 19 for passivation, which can consist of glass or a glass ceramic and is covered with a cover 20.

According to FIG. 1, a ceramic plate is applied to the protective layer 19 as a cover 20. The ceramic plate represents additional passivation and acts as a mechanical "protective shield" against abrasion by particles in the housing in which the actual temperature sensor is installed.

In the temperature sensor shown in FIG. 1, the terminal contacts 12, 13 of the temperature sensor are strain-relieved with connecting wires 21 and 22 via connection pads 23 and 24 with a fixation 25 consisting of an electrically insulating fixing drop. This fixation 25 consists of high-purity glass or glass ceramic.

In addition to the initially mentioned embodiment of the intermediate layer 18 as a diffusion barrier, it should be noted that this is applied either in the thin-film process with a thickness in the range from 0.2 to 10 μm, preferably 5 μm, or in the thick-film process with a thickness in the range from 5 to 50 μm, preferably 15 μm.

The thickness of the connection pads 23, 24 on the resistance structure 11 is in the range from 10 to 50 μm, preferably 20 μm. As a carrier, the substrate 16 has a thickness in the range from 0.1 mm to 1 mm, preferably 0.4 mm, particularly preferably 0.38 mm.

The terminal contacts 12, 13 are both arranged on one side. In addition, however, it is also possible to arrange both terminal contacts 12, 13 on opposite sides.

FIG. 2a shows a schematic top view of an insulation layer 17 having a resistance structure 11 of a temperature sensor known from the prior art disposed thereon. The insulation layer 17 and resistance structure 11 shown in FIG. 2a can be used, for example, in the temperature sensor shown in FIG. 1. The insulation layer 17 shown has no openings.

FIGS. 2b to 2d show schematic top views of the insulation layers 17 having openings 30, 30a-d and resistance structures 11 disposed thereon according to various embodiments of the invention.

In the embodiment shown in FIG. 2b, an opening 30, which exposes a surface of the substrate, is formed in the insulation layer 17. The opening 30 can be designed in such a way that a central segment is created in the insulation layer 17, which segment is preferably arranged in the middle of the substrate. The central segment has edges, in which the edges of the central segment do not have a common termination with the edges of the substrate. In the embodiment shown, the opening 30 is shown as a circumferential opening in the material of the insulation layer 17, which opening exposes a surface of the substrate. The edges of the substrate and the areas of the substrate surface adjoining the edges are not covered by the insulation layer. In this case, the insulation layer 17 can initially be applied completely to the surface of the substrate and then removed again in a circumferential edge region.

In the embodiment shown in FIG. 2c, the opening 30 in the insulation layer 17 is designed in the shape of a slot and completely surrounds the resistance structure 11 and the terminal contacts 12, 13. The slot width can be, for example, in a range from 10 μm to 1 mm.

FIG. 2d shows an embodiment in which several slot-shaped openings 30, 30a-d are made in the material of the insulation layer 17 and form several segments in the insulation layer 17. In the embodiment shown, individual slot-shaped openings 30, 30a-d surround the terminal contacts 12, 13 and the resistance structure 11.

FIGS. 3a and 3b are schematic sectional views through a substrate 16 having an insulation layer 17 disposed thereon having openings 30, a resistance structure 11, an intermediate layer 18, and a protective layer 19 according to an embodiment of the invention. In the embodiment shown, the material of the protective layer 19 completely fills the openings 17. The openings 17 filled with the material of the protective layer 19 form a diffusion barrier for foreign atoms from the edges of the insulation layer 17 into the central segment. There is no protective layer 19 in the area of the terminal contacts 12, 13, as is shown in FIG. 3b. In FIG. 3b, openings 30b and 30c are shown, which partially include the terminal contacts 12, 13 and opening 30d, which is arranged between the terminal contacts 12, 13.

The features of the invention disclosed in the preceding description and in the claims, figures, and exemplary embodiments can be essential both individually and in any combination for the implementation of the invention in its various embodiments.

LIST OF REFERENCE NUMERALS

11 Resistance structure
12, 13 Terminal contact
14, 15 Electrode
16 Substrate
17 Insulation layer
18 Intermediate layer
19 Protective layer
20 Cover
21, 22 Connecting wire
23, 24 Connection pad
25 Fixation
30, 30a-d Opening

The invention claimed is:

1. A temperature sensor comprising:
a coated substrate, wherein the substrate contains a zirconium oxide or a zirconium oxide ceramic;
at least one resistance structure; and
at least two terminal contacts;
wherein the terminal contacts make electrical contact with the resistance structure;
wherein the substrate is coated with an insulation layer;
wherein the insulation layer contains a metal oxide layer, the resistance structure and the exposed areas of the insulation layer, on which no resistance structure is arranged, are at least partially coated with a ceramic intermediate layer, and a protective layer or a cover is arranged on the ceramic intermediate layer; and
wherein at least one opening is formed in the insulation layer, which opening exposes a surface of the substrate at least in sections.

2. The temperature sensor according to claim 1, wherein the at least one opening is designed in the shape of slots, wherein the width of the slots is between 5 μm and 1 mm.

3. The temperature sensor according to claim 1, wherein the at least one opening is designed in the shape of slots, wherein the width of the slots is between 20 μm and 100 μm.

4. The temperature sensor according to claim 2, wherein the slots of the at least one opening have longitudinal extensions formed parallel or perpendicular to a longitudinal extension of the substrate, or wherein the slots of the at least one opening have longitudinal extensions formed parallel to one another.

5. The temperature sensor according to claim 1, wherein the at least one opening exposes at least one side surface of the substrate.

6. The temperature sensor according to claim 1, wherein the at least one opening completely surrounds the resistance structure.

7. The temperature sensor according to claim 1, wherein the at least one opening partially frames at least one of the two terminal contacts of the resistance structure.

8. The temperature sensor according to claim 1, wherein the at least one opening is filled with a material of the protective layer.

9. The temperature sensor according to claim 1, wherein the zirconium oxide or the zirconium oxide in the zirconium oxide ceramic is stabilized with oxides of a trivalent and a pentavalent metal, or at least one electrode is arranged on at least one terminal contact next to the resistance structure on the insulation layer, wherein the electrode or electrodes are formed as one piece with the resistance structure.

10. The temperature sensor according to claim 1, wherein the insulation layer is an aluminum oxide layer.

11. The temperature sensor according to claim 1, wherein the ceramic intermediate layer has a thickness between 1 μm and 50 μm.

12. The temperature sensor according to claim 1, wherein the ceramic intermediate layer has a thickness between 4 μm and 10 μm.

13. The temperature sensor according to claim 1, wherein the protective layer includes a glass or a glass ceramic or the cover is a ceramic plate.

14. The temperature sensor according to claim 1, wherein the resistance structure includes a platinum material or a platinum alloy, or a platinum-based alloy.

* * * * *